UNITED STATES PATENT OFFICE.

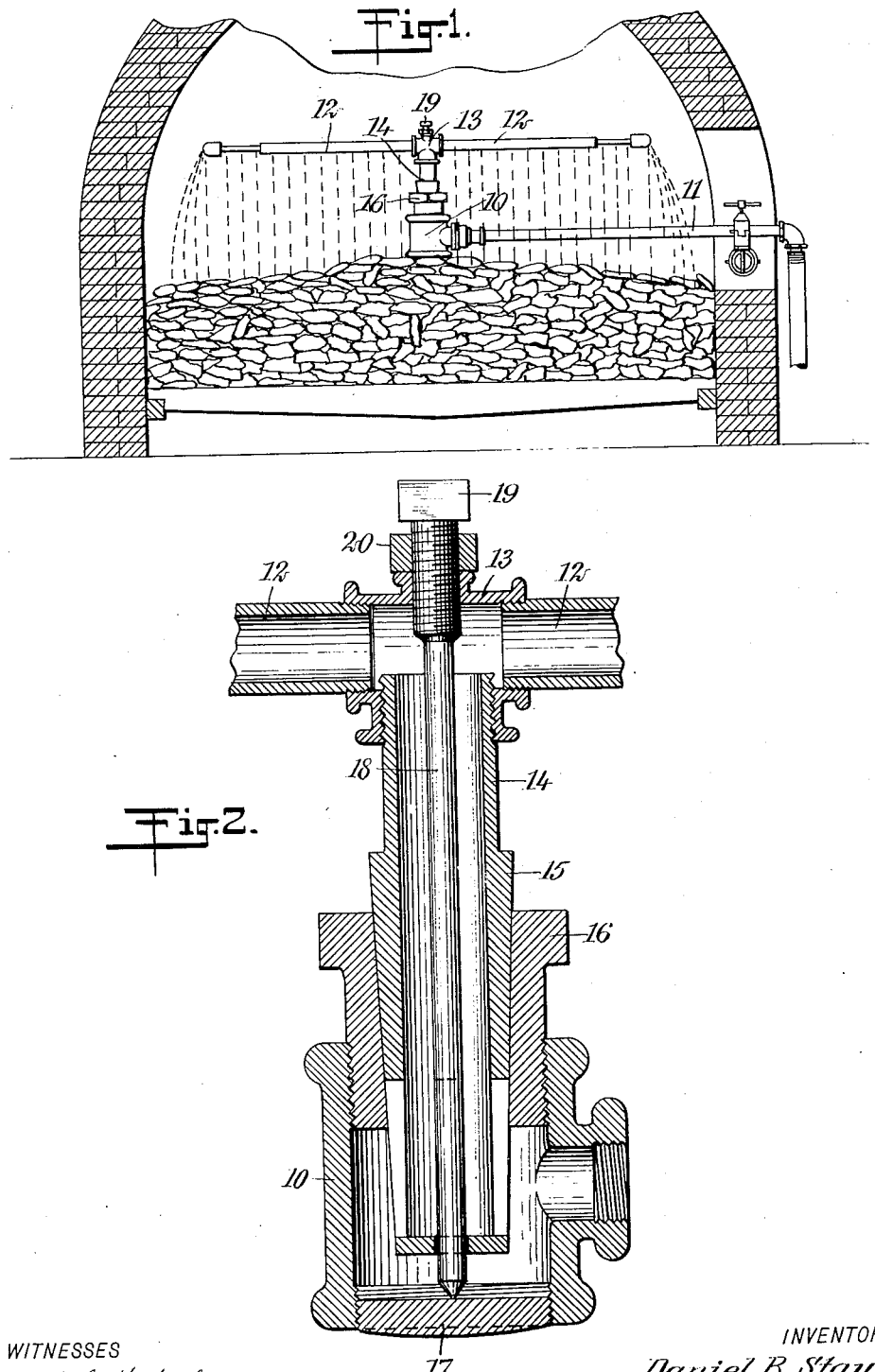

DANIEL BERKEY STAUFT, OF SCOTTDALE, PENNSYLVANIA.

APPARATUS FOR WATERING COKE-OVENS.

No. 925,241.

Specification of Letters Patent.

Patented June 15, 1909.

Application filed April 15, 1908. Serial No. 427,242.

*To all whom it may concern:*

Be it known that I, DANIEL BERKEY STAUFT, a citizen of the United States, and a resident of Scottdale, in the county of Westmoreland and State of Pennsylvania, have invented a new and Improved Apparatus for Watering Coke-Ovens, of which the following is a full, clear, and exact description.

This invention is an improvement in appliances of the character disclosed in Letters Patent, No. 724,350, granted to me March 31, 1903, for watering coke-ovens, the present invention being particularly directed to improvements in the pivotal support of the revolving sprinkler-pipes, and has for its purpose to provide for the adjustment of the tubular pivot and prevent leakage taking place thereabout; also to greatly simplify the construction, which I do by dispensing with the manually-operated means for revolving the sprinkler-pipes, and construct the tubular pivot with a conical portion, the same being fitted within a bushing carried by the casing and having a corresponding bore, and the pivot is provided with a spindle having a bearing on the casing and adjustable in the direction of its length.

Reference is to be had to the accompanying drawings forming a part of this specification, in which similar characters of reference indicate corresponding parts in both views.

Figure 1 is a central vertical section through a beehive coke-oven, showing my improved sprinkler apparatus applied thereto; and Fig. 2 is a vertical central section through the apparatus, showing the nature of my improvements.

In the construction of my improved apparatus I employ a central casing or tee 10, to which leads at one side, a supply pipe 11, the latter being supported and arranged in all respects like the supply pipe in my patent referred to, differing therefrom only in that it does not contain the manually-operated device for revolving the sprinkler-pipe.

The sprinkler-pipes 12 connect to the opposite ends of a tee 13, which also carries a central tubular pivot 14 having a conical lower portion 15 fitting within a bushing 16, which threads into the upper end of the casing 10. The opposite and lower end of the casing 10 is closed by a plug 17 which forms a bearing for the conical or pointed extremity of a spindle 18, the latter extending centrally and longitudinally through the pivot tube, and is threaded through the top of the tee 13, where it is preferably of expanded diameter and provided with an operating-head 19, and a lock-nut 20 which serves to lock it in adjusted position. By adjusting the spindle 18, the weight of the sprinkler pipes or arms and connected parts may be removed from the pivot tube to the spindle, and a watertight joint between the tubular pivot and the bushing 16 maintained. In this manner any wear which takes place in the bearing of the pivot or on the point of the spindle may be easily compensated for, and leakage at all times prevented about the pivot with the least possible friction.

Having thus described my invention, I claim as new and desire to secure by Letters Patent:

1. The combination of a casing, a pivot tube revoluble in the casing and communicating therewith, radiating tubular arms connecting with the upper end of the pivot, and a spindle supporting the pivot tube and the parts carried thereby.

2. The combination of a casing, a pivot tube revoluble in said casing and communicating therewith, said pivot having a conical bearing portion, radiating tubular arms connecting with the upper end of the pivot, and an adjustable spindle passing through the pivot tube and bearing on the casing for relieving the conical portion of the tube of the weight of the tube and arms.

3. The combination of a casing having a bushing provided with a conical bore, a tubular pivot having a conical portion fitting within said bore and communicating with the casing, a tee connected to the upper end of the pivot, and a spindle threaded through the tee having a bearing on the casing.

4. The combination of a casing having a conical bearing at one end, a tubular pivot communicating with the casing, having a conical portion fitting within said bearing, and an adjustable spindle passing through the pivot and bearing on said casing.

5. The combination of a casing having a conical bearing at its upper end, a tubular pivot communicating with the casing and having a conical portion fitting within said bearing, a tubular member threaded on the upper end of the pivot, and a spindle threaded through the member, having a bearing on the bottom of the casing.

In testimony whereof I have signed my name to this specification in the presence of two subscribing witnesses.

DANIEL BERKEY STAUFT.

Witnesses:
JOHN C. BRYSON,
ESTHER E. GRAFFINS.